United States Patent [19]

Fournier et al.

[11] Patent Number: 4,898,211

[45] Date of Patent: Feb. 6, 1990

[54] COUNTERBALANCED REFUELING ARM ASSEMBLY

[75] Inventors: Paul J. E. Fournier, Jackson; Joseph F. Reinker, Jr., Parma, both of Mich.

[73] Assignee: Aeroquip Corporation, Jackson, Mich.

[21] Appl. No.: 273,600

[22] Filed: Nov. 21, 1988

[51] Int. Cl.$^4$ ............................................. F16L 3/00
[52] U.S. Cl. ................................. 137/615; 137/899.3; 141/387
[58] Field of Search ............... 141/387, 279, 388; 137/615, 899.3

[56] References Cited

U.S. PATENT DOCUMENTS

| | | | |
|---|---|---|---|
| 3,864,441 | 2/1975 | Suzuki | 137/615 |
| 3,891,004 | 6/1975 | Knight | 137/615 |
| 4,416,306 | 11/1983 | Le Devehat | 137/615 |
| 4,474,213 | 10/1984 | Jameson | 137/615 |
| 4,653,554 | 3/1987 | Von Meyerinck et al. | 137/615 |
| 4,658,873 | 4/1987 | Von Meyerinck et al. | 137/615 |

*Primary Examiner*—A. Michael Chambers
*Attorney, Agent, or Firm*—Beaman & Beaman

[57] ABSTRACT

A rigid conduit refueling system for aircraft consisting of a wheeled support platform upon which swivel joints connected to a fuel supply source communicate with an arm conduit having a lower end pivotally mounted to the support platform and the upper end communicates with three elbow swivel couplings associated with a nozzle whereby the nozzle may be attached to the aircraft fuel tank inlet. Counterbalancing expansible chamber motors associated with the support platform and arm conduit bear the weight of the elevated components as controlled by a closed fluid circuit.

6 Claims, 4 Drawing Sheets

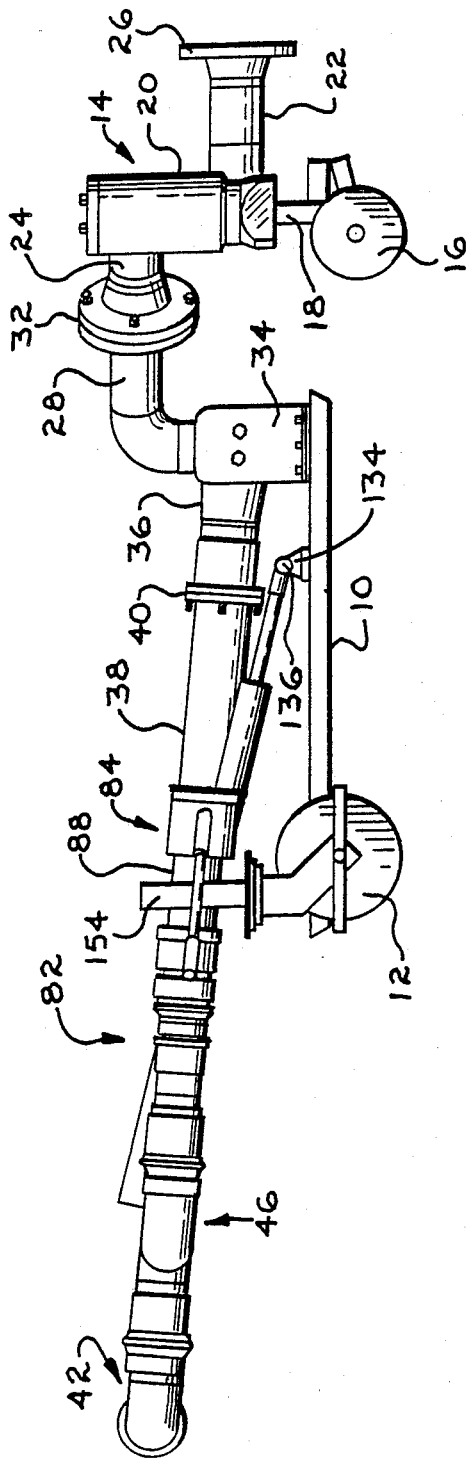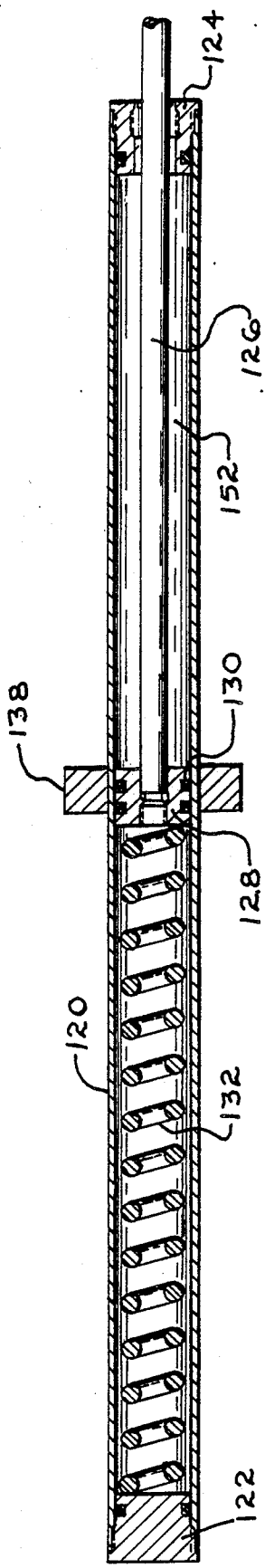

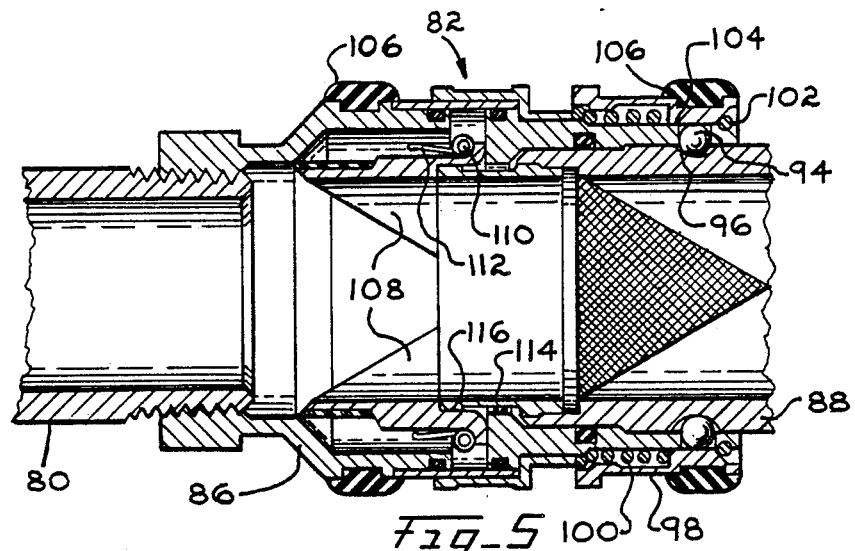
Fig_5
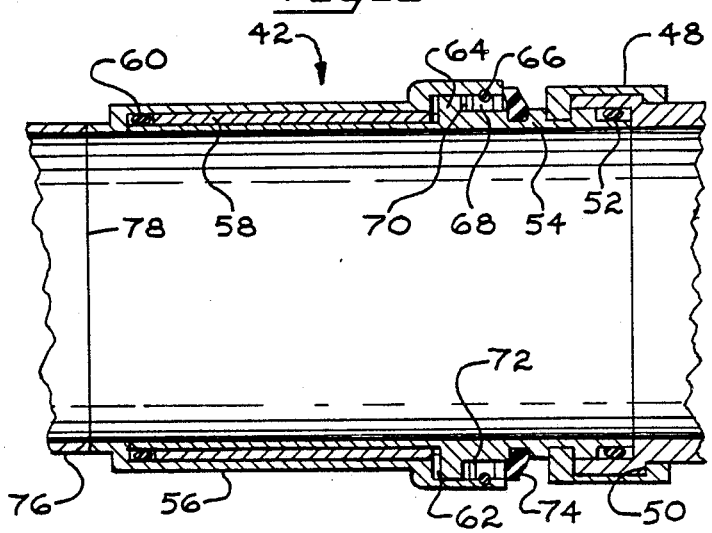
Fig_6
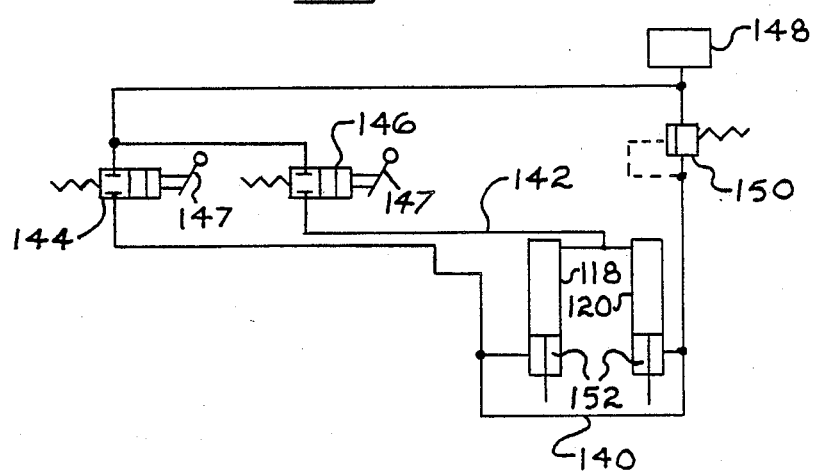
Fig_7

COUNTERBALANCED REFUELING ARM ASSEMBLY

BACKGROUND OF THE INVENTION

In the refueling of aircraft, particularly military aircraft, it is highly desirable that refueling cycles be as short as possible. Also, as with all refueling procedures it is necessary that utmost safety be achieved.

To reduce the duration of refueling procedures refueling takes place under a pressurized system, and flexible hose, in the past, have been utilized. However, flexible hose is susceptible to damage due to wear, being crushed by vehicle wheels, and the like, and hose of such significant diameters as handle large flow capacities to shorten the fueling duration, such as 4" and 5" ID, is heavy and difficult to handle. The aircraft refueling intake ports are normally located at an elevated position requiring the refueling operator to lift the nozzle and attendant hose during connection of the hose nozzle to the port. This is a difficult procedure with large diameter hose.

To overcome the problems in refueling aircraft with relatively large diameter flexible refueling hose, to improve the durability and safety aspects of the refueling supply system, and to reduce the weight of the refueling conduit system which must be lifted by the operator during connecting the refueling system to the aircraft tank port, and removable therefrom, the rigid conduit refueling system of the invention has been invented.

It is an object of the invention to provide an all-rigid conduit refueling system wherein relatively large diameter conduits may be employed and yet the weight which must be supported by the operator is relatively low.

Another object of the invention is to provide an all-rigid conduit refueling system utilizing an elongated rigid conduit having an outer end to which a plurality of elbow couplings are mounted to achieve a universal movement of a nozzle associated with the swivel coupling chain.

Yet a further object of the invention is to provide an all-rigid conduit refueling system employing a rigid arm conduit pivotally mounted upon a support platform wherein the weight of the upper end of the arm conduit is counterbalanced and the weight of a plurality of swivel couplings mounted upon the arm conduit upper end are substantially borne by the counterbalancing structure.

The rigid conduit refueling structure of the invention is mounted upon wheeled structure for ease of positioning, and the wheeled structure includes a support platform and an outboard caster. The outboard caster includes a swivel joint having a vertical axis of rotation and the swivel joint inlet communicates with a fuel supply conduit, while the joint outlet is attached to a rigid conduit leading to the inlet of a swivel joint mounted upon the support platform having a horizontal axis of rotation. The platform mounted swivel joint outlet is connected to an elongated rigid arm conduit, and the outer end of the arm conduit communicates with a series-connected chain of elbow swivel couplings terminating in a nozzle connectable to the aircraft fuel tank port.

The weight of the arm conduit and associated swivel couplings and nozzle is borne by counterbalancing expansible chamber motors of the liquid type interposed between the support platform and the arm conduit. A control circuit is associated with the counterbalancing chambers, and the chambers include compression springs and fluid cylinders to support the weight of the arm conduit and its associated elbow swivel couplings.

The chain of series-connected elbow swivel couplings permits the nozzle to be located and angularly oriented as desired, and the mounting of the structure upon the wheeled platform and caster permits the refueling apparatus to be positioned as desired and the flexibility of a hose system is achieved without the disadvantages thereof.

BRIEF DESCRIPTION OF THE DRAWINGS

The aforementioned objects and advantages of the invention will be appreciated from the following description and accompanying drawings wherein:

FIG. 3 is a side elevational view of the refueling apparatus illustrating the arm conduit in a lowered condition, FIG. 4 is an elevational, sectional view of a counterbalancing cylinder as taken along Section IV—IV of FIG. 1, FIG. 5 is an elevational, sectional view as taken through the structure connecting the third swivel coupling to the nozzle as taken along Section V—V of FIG. 1, FIG. 6 is an elevational, sectional view taken through a swivel coupling along Section VI-VI of FIG. 1, and FIG. 7 is a schematic view of the fluid control circuit utilized with the counterbalancing cylinders.

DESCRIPTION OF THE PREFERRED EMBODIMENTS

Figure 1:
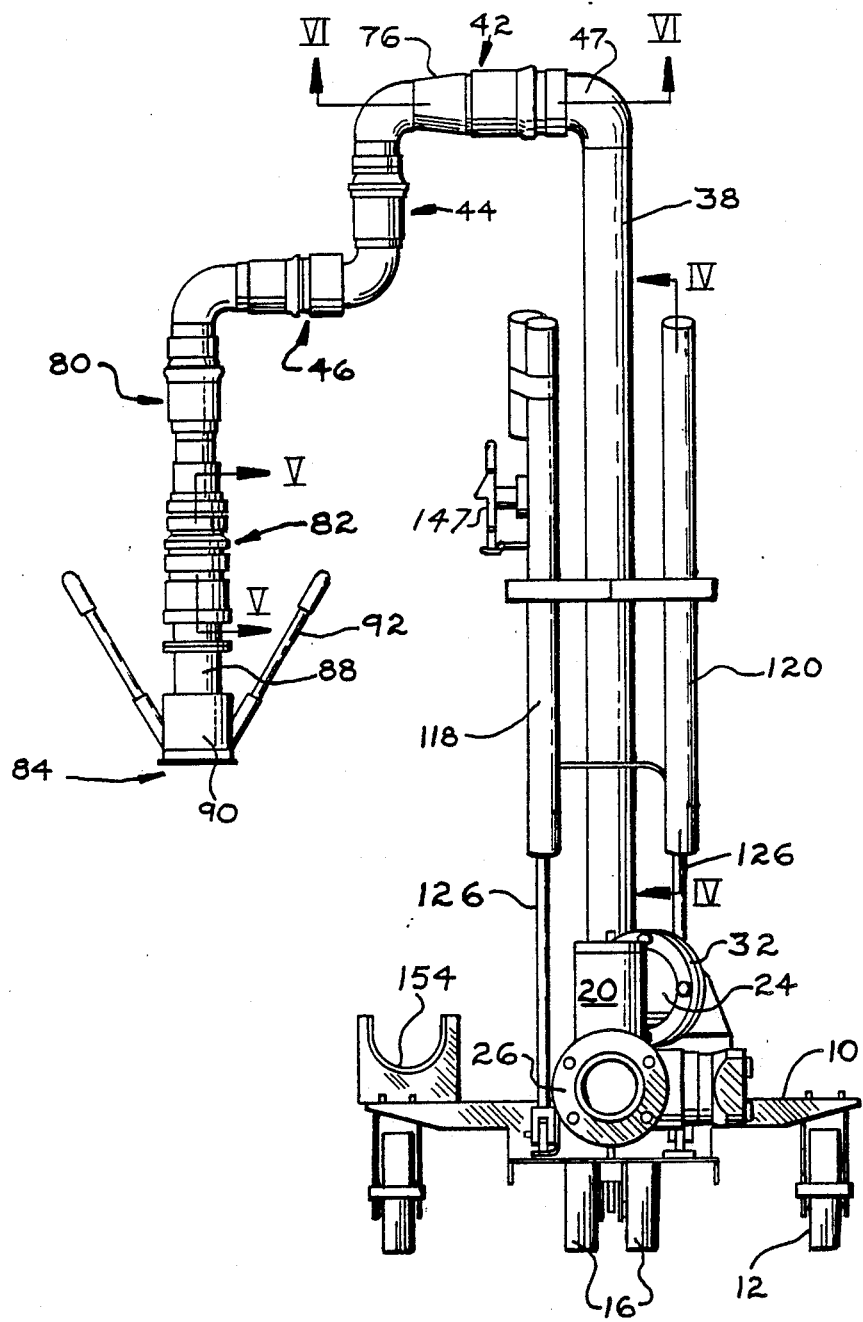
FIG. 1 is a front elevational view illustrating the refueling apparatus with the arm conduit in an elevated condition and the nozzle in a downwardly extending position.
Figure 2:
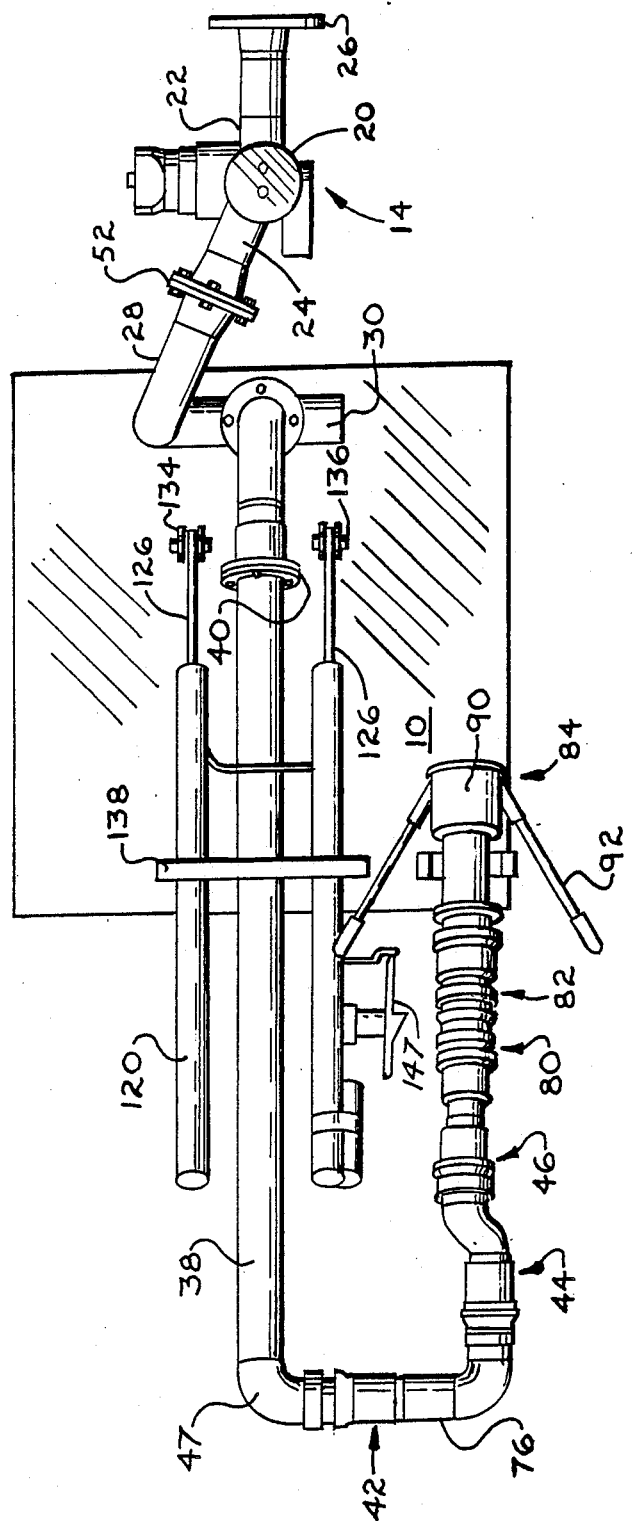
FIG. 2 is a top plan view of the refueling apparatus as shown in FIG. 1.

The overall relationship of the components of a rigid conduit refueling assembly in accord with the invention is best appreciated from FIGS. 1-3.

The apparatus is mounted upon wheeled assemblies which include a support platform 10 having a pair of wheels 12 extending therebelow. The wheels 12 are mounted upon fixed axles by supporting brackets, and the wheel axles are not capable of rotating about a vertical axis. In contrast, an outboard caster assembly 14 includes a caster wheel 16 having a horizontal axle which is mounted upon the vertically-mounted axle 18. As later described, the outboard caster assembly 18 is rigidly connected to the support platform 10.

The outboard caster assembly includes a swivel joint 20 having a vertical axis of rotation. The swivel joint includes conventional seals and the like wherein the joint inlet conduit 22 communicating with the lower end of the joint is in communication with the outlet conduit 24 located at the joint upper end. In this manner, fluid entering the inlet 22 passes through the swivel joint into the outlet conduit 24 regardless of the angular relationship between the inlet and the outlet. The inlet 22 is provided with a flange coupling 26 as to be bolted to a fuel supply source, not shown, usually a flexible hose which supplies the fueling assembly.

The outlet conduit 24 is connected to the fixed inlet conduit 28 of the elbow type of the swivel joint 30 mounted upon the support platform 10. The swivel joint 30 has a horizontal axis of rotation, and the interconnection of the outlet 24 with the inlet 28 is through the bolted flange system 32.

The support platform swivel joint 30 is mounted upon brackets 34, FIG. 3, and includes an outlet 36 having an axis transversely disposed to the horizontal axis of the swivel joint 30. As will be appreciated from FIG. 2, the outlet conduit 36 is centrally located with respect to the width of the support platform 10.

An elongated arm conduit 38 is attached at its lower end by flanges 40 to the outlet conduit 36 and in coaxial relationship thereto. Thus, the swivel joint 30 permits the arm conduit to pivot in a vertical plane about the axis of the swivel joint.

The upper end of the arm conduit 38 is in communication with three series-connected elbow swivel couplings 42, 44, and 46, each of these identical couplings including an inlet end and an outlet end and an elbow. Additionally, the outer end of the arm conduit 38 includes a fixed elbow 47 to which the swivel coupling 42 is affixed With reference to FIG. 6, the construction of the elbow swivel couplings 42, 44 and 46 will be appreciated. The coupling 42 is attached to the arm conduit 38 by band 48 associated with shoulder 50 defined upon the elbow 47, and a seal ring 52 interposed between the elbow 47 and the inner sleeve 54 of the coupling 42 establishes a sealed relationship between the arm conduit 38 and the swivel coupling 42. The coupling 42 also includes an outer jacket 56 and synthetic bearing 58 located between the inner sleeve and the outer jacket permits relative rotation to take place therebetween. An O-ring 60 establishes a sealed relationship between the sleeve and jacket and a wave spring 62 interposed between the jacket and the sleeve shoulder 64 maintains a tight axial relationship between the sleeve and jacket. Axial separation of the sleeve and jacket is prevented by the drive wire 66 received within an annular groove within the jacket 56 and in the metal ring 68, and a washer 70, and axial bearing 72, interposed between the ring 68 and the shoulder 64, maintain the proper axial orientation between the sleeve and jacket. An elastic dust seal 74 of a ring configuration prevents foreign matter from entering the end of the jacket. An elbow 76 is welded to the jacket at weld line 78, as will be appreciated from FIGS. 1 and 6. In this manner, the jacket 56 and elbow 76 are capable of rotation about the sleeve 54 and its axis.

The end of the elbow 76 includes a shoulder similar to 50 and is affixed to the adjacent sleeve of the elbow swivel coupling 44 in the manner described above, and the second elbow coupling 44 and the third elbow coupling 46 are interconnected in this manner and utilize identical internal structure.

The outlet end of the third swivel coupling 46 has an adapter 80 attached thereto having a threaded end 82 as shown in FIG. 5 which is threaded into a dry-break coupling 82, FIG. 5, to which the nozzle structure 84 is attached. The coupling body 86 is attached to the nozzle conduit 88 by locking structure shown in FIG. 5, and the nozzle conduit attaches to the nozzle 90 which has an internal configuration complementary to the aircraft tank port and may be attached to the tank port by rotation of the handles 92.

The coupling body 86 includes an extension which overlaps the nozzle conduit 88 and a plurality of radially movable ball detents 94 are located within openings in the extension for selective cooperation with the annular groove 96 defined in the nozzle conduit. In the known manner, a sleeve 98 biased to the right by the compression spring 100, and whose movement to the right, FIG. 5, is limited by engagement with the drive wire 102, includes a cam surface 104 for holding the ball detents in the groove 96 when the sleeve is at its rightmost position, FIG. 5. Retraction of the sleeve 98 to the left releases the balls from the groove permitting the nozzle 90 to be separated from the coupling 82. Annular elastomeric bumpers 106 located on the coupling body and sleeve protect the coupling and sleeve from damage.

The coupling 82 includes a pair of clam shell valve halfs 108 each pivotally mounted at 110, and biased toward an engaged sealing relationship by torsion springs 112. The valves 108 are maintained in their open condition by a valve retainer 114 mounted in the conduit 88 having an outer end received within the valve recesses 116. Thus, upon separation of the nozzle conduit 88 from the coupling 82 the retainer 114 is withdrawn from the valves permitting the valves to pivot to a closed condition preventing fluid flow from the coupling.

The weight of the arm conduit 38, the three swivel couplings 42, 44 and 46 and the nozzle structure 84, is supported by a pair of counterbalancing expansible chamber cylinders 118 and 120. The cylinders are mounted upon opposite sides of the arm conduit 38 and each cylinder is closed at its outer end, FIG. 4, by the threaded head 122. Each cylinder also includes an inner threaded head 124 through which the piston rod 126 extends. Interiorly, the piston rod is affixed to the piston 128 sealed to the interior of the associated cylinder by a pair of annular ring seals 130. A heavy-duty compression spring 132 is interposed between the piston 128 and the outer head 122. The lower end of the piston rods 126 are pivotally connected to the support platform 10 by brackets 134 and pivots 136.

The cylinders 118 and 120 are affixed to the arm conduit 38 by a yoke 138 and the yoke has a slidable relationship with the arm conduit 38 so as to prevent binding as the arm pivots through its operative range about the axis of the swivel joint 30.

A control circuit is associated with the counterbalancing cylinders 118 and 120 as schematically illustrated in FIG. 7. At the rod end the cylinders communicate with conduit 140, while at the spring end the cylinders are in communication with conduit 142. A valve 144 controls the flow through conduit 140 while valve 146 controls the fluid flow through conduit 142 and the valves 144 and 146 are controlled simultaneously by a handle 147. A reservoir 148 is included in the system, and a relief valve 150 is located within conduit 140 communicating with the accumulator.

The cylinder chamber 152 between the piston 128 and the head 124 is filled with hydraulic oil, as is the control circuit and the chamber between head 122 and piston 128, and as the cylinders 118 and 120 are connected in a parallel relationship, it is possible to lock the angular position of the arm conduit 38 as desired by closing the valves 144 and 146. To adjust the angular position of the arm conduit the valves are positioned in their open or flowthrough condition. The springs 132 are of sufficient capacity to substantially bear the weight of the arm conduit and its associated fittings, and accordingly, little effort is required by the operator to raise and lower the arm conduit and its outer end components.

A cradle 154 is attached to the support platform 10 for receiving the nozzle conduit 88 when the arm conduit 38 is in its lowered condition as shown in FIGS. 2 and 3.

In use, the fact that the rigid conduit refueling assembly is mounted upon wheels 12 and 16 permits the assembly to be wheeled adjacent the aircraft to be refueled. Thereupon, the operator raises the arm conduit 38 manually to the desired elevation which removes the nozzle conduit 88 from the cradle 154. Such elevating of the arm conduit and associated swivel couplings and nozzle is aided by the force of the springs 132. Once the arm conduit 38 is elevated as desired, the valves 144 and 146 are closed by handle 147 to lock the arm conduit in this elevation. Thereupon, the operator grasps the nozzle handles 92 and fixes the nozzle 90 to the aircraft tank inlet and rotates the handles to establish a seal connection therewith. Thereupon, the fluid flow through the apparatus is commenced to achieve refueling.

The use of the three swivel couplings 42, 44 and 46 provides a universal support and adjustment of the nozzle structure 84 with respect to the arm conduit 38, and accordingly, the nozzle may be angularly located as desired when attaching the same to the aircraft inlet port.

It will be appreciated that as all of the conduit components of the apparatus are formed of metal and are rigid, the invention eliminates the aforedescribed disadvantages of flexible hose refueling apparatus, and as the conduits of the apparatus may be formed of relatively large size, the refueling apparatus is capable of handling high volumes of fuel.

It will be understood that various modifications to the inventive concepts may be apparent to those skilled in the art without departing from the spirit and scope of the invention.

We claim:

1. A counterbalanced refueling arm comprising, in combination, a supporting platform, wheels supporting said platform, an outboard caster assembly, said assembly including a caster wheel, a first swivel joint mounted on said outboard caster assembly having a substantially vertical axis of rotation, an inlet and an outlet defined on said joint, a fuel supply conduit communicating with said joint inlet, a second swivel joint mounted on said platform having a substantially horizontal axis of rotation, an inlet and an outlet, a rigid conduit interconnecting said first joint outlet with said second joint inlet establishing communication between said first and second joints, a substantially rigid arm conduit having an axis, an inner end affixed to and communicating with said second joint outlet and an outer end, said arm conduit being pivoted about said second joint axis within a substantially vertical plane, a first elbow swivel coupling having an inlet connected to said arm conduit outer end, an outlet and an axis of rotation transverse to said arm conduit axis, a second elbow swivel coupling having an inlet connected to said first coupling outlet, an outlet and an axis of rotation transverse to said first coupling axis, a third elbow swivel coupling having an inlet connected to said second coupling outlet, an outlet and an axis of rotation transverse to said coupling axis, and a nozzle connected to said third coupling outlet.

2. In a counterbalanced refueling arm as in claim 1, a cradle defined on said platform, said cradle adapted to selectively receive said nozzle.

3. In a counterbalanced refueling arm as in claim 1, counterbalancing means mounted upon said platform connected to said arm conduit at a location spaced from said inner end, said counterbalancing means counterbalancing the weight of said arm conduit and the elbow couplings and the nozzle attached thereto.

4. In a counterbalanced refueling arm as in claim 3, said counterbalancing means comprising at least one expansible chamber unit comprising a cylinder member receiving a piston member, one of said members being affixed to said platform and the other of said members being attached to said arm conduit, and a spring interposed between said members.

5. In a counterbalanced refueling arm as in claim 4, a pair of said expansible chamber unit interposed between said platform and said arm conduit, said units being parallel to each other and located upon opposite sides of the plane of movement of said arm conduit.

6. In a counterbalanced refueling arm as in claim 5, said expansible chamber units utilizing a liquid control medium, control conduits interconnecting said units in parallel, and control valves located within said control conduits regulating the extent of movement and operation of said counterbalancing units.

* * * * *